United States Patent
Long et al.

(10) Patent No.: US 8,374,383 B2
(45) Date of Patent: Feb. 12, 2013

(54) SYSTEMS, DEVICES, AND/OR METHODS FOR MANAGING IMAGES

(75) Inventors: Richard G. Long, Hollis, NH (US); Ming Lei, Acton, MA (US); Jeffrey C. Snyder, Warren, OH (US); John E. Agapakis, Sudbury, MA (US)

(73) Assignee: Microscan Systems, Inc., Renton, WA (US)

( * ) Notice: Subject to any disclaimer, the term of this patent is extended or adjusted under 35 U.S.C. 154(b) by 1291 days.

(21) Appl. No.: 12/045,100

(22) Filed: Mar. 10, 2008

(65) Prior Publication Data

US 2008/0253608 A1  Oct. 16, 2008

Related U.S. Application Data

(60) Provisional application No. 60/905,757, filed on Mar. 8, 2007.

(51) Int. Cl.
*G06K 9/00* (2006.01)
(52) U.S. Cl. ....................... 382/100
(58) Field of Classification Search ............... 382/100, 382/173
See application file for complete search history.

(56) References Cited

U.S. PATENT DOCUMENTS

| | | | | |
|---|---|---|---|---|
| 7,438,232 B2* | 10/2008 | Uchiyama | ............... | 235/462.1 |
| 7,636,483 B2* | 12/2009 | Yamaguchi et al. | ............. | 382/239 |
| 7,764,835 B2* | 7/2010 | Takakura et al. | ............. | 382/168 |
| 2002/0051573 A1* | 5/2002 | Sakai et al. | ................. | 382/194 |

OTHER PUBLICATIONS

International Search Report, International Application No. PCT/US2008/003203, mail date Jul. 31, 2008.
Written Opinion of the International Searching Authority, International Application No. PCT/ US2008/003203, mail date Jul. 31, 2008.
Fiala, "Comparing ARTag and ARToolkit Plus Fiducial Marker Systems", Oct. 1, 2005, 6 pages, HAVE 2005—IEEE International Workshop on Haptic Audio Visual Environments and their Applications.
Rekimoto, "Matrix: A Realtime Object Identification and Registration Method for Augmented Reality", Jul. 15, 1998, 6 pages, Proc. of 3rd Asian Pacific Computer Human interaction, IEEE Computer Society.
Siemens Automation & Drives, "Image Processing Systems SIMATIC MV for Quality Assurance and Increased Productivity"—Brochure, Nov. 2006, 24 pages.
U.S. DoD, "Item Unique Identification", 2006, 22 pages, downloaded from: http://www.acq.osd.mil/dpap/UID/attachments/iuid-101-20060130.pdf.
CN 200880007649.9—Second Chinese Office Action w/ Translation, issued Nov. 1, 2012, 9 pages.

* cited by examiner

*Primary Examiner* — Tom Y Lu
(74) *Attorney, Agent, or Firm* — Blakely Sokoloff Taylor & Zafman LLP (57) ABSTRACT

Certain exemplary embodiments can provide a method comprising, responsive to a determination that a machine-readable two-dimensional code has been identified in a first image, said first image comprising a first plurality of pixels defining said machine-readable two-dimensional code and second plurality of pixels defining a non-code zone, automatically causing a saving or displaying of a second image that comprises said machine-readable two-dimensional code or a representation of said machine-readable two-dimensional code and that excludes said non-code zone.

6 Claims, 5 Drawing Sheets

SYSTEMS, DEVICES, AND/OR METHODS FOR MANAGING IMAGES

CROSS-REFERENCES TO RELATED APPLICATIONS

This application claims priority to, and incorporates by reference herein in its entirety, U.S. Provisional Patent Application Ser. No. 60/905,757, filed 8 Mar. 2007.

BACKGROUND

Placing a camera in a secure/top secret environment can present a serious security risk. Any camera used in machine vision applications for measurement or inspection of parts can have the potential for recording images of a sensitive nature. While disabling the presentation of any images is preferable, this extreme response can render the camera unusable for aiding the location of part marks or other features, such as a Unique Item Identifier (UTI) or Unique Identifier (UID), which is a set of data elements marked on an item (as opposed to an RFID tag applied to its packaging) that is globally unique and unambiguous. Improved devices, systems, and/or methods for managing such images can be desirable for certain applications.

SUMMARY

Certain exemplary embodiments can provide a method comprising, responsive to a determination that a machine-readable two-dimensional code has been identified in a first image, said first image comprising a first plurality of pixels defining said machine-readable two-dimensional code and second plurality of pixels defining a non-code zone, automatically causing a saving or displaying of a second image that comprises said machine-readable two-dimensional code or a representation of said machine-readable two-dimensional code and that excludes said non-code zone.

Certain exemplary embodiments can provide a method comprising, responsive to a determination that a machine-readable two-dimensional code has been identified in a first image comprising said machine-readable two-dimensional code and a non-code zone, automatically causing a saving or displaying of only a representation of said machine-readable two-dimensional code.

BRIEF DESCRIPTION OF THE DRAWINGS

A wide variety of potential practical and useful embodiments will be more readily understood through the following detailed description of certain exemplary embodiments, with reference to the accompanying exemplary drawings in which.

DETAILED DESCRIPTION

Certain exemplary embodiments can save images in high security Unique Identification (UID) areas by adding a function that can allow an image to be saved only if a one-dimensional code, such as a bar code, and/or a two-dimensional code, such as a Data Matrix and/or a Direct Part Mark, is identified in the image. As a result, certain exemplary embodiments can prevent random images from being stored. In an embodiment, a UID Checker can be written as a Visual Basic addition to Direct Part Mark verification software, such as that used with and/or by the Simatic Hawkeye 1500 series code reading system (including the ReadRunner code reading software), the Simatic VS 130-2 vision sensor systems, and/or the Simatic VS720 intelligent camera systems, all from Siemens AG of Nurnberg, Germany.

In their current implementation, Data Matrix symbols have a checkerboard appearance, with each uniformly spaced square shaped cell corresponding to a data bit. They are constructed of a mosaic of light and dark elements that must all be read before any characters can be recognized. Matrix symbols are encoded with a binary code requiring an imager to read them. A typical Data Matrix can store from 1 to approximately 2,000 characters. The symbol is square or rectangular and can range from approximately 0.001 inch per side up to approximately 14 inches per side.

A Data Matrix can be marked directly on the item surface or by affixing a label or data plate to the item (such as according to MIL-STD-130), and preferably the Data Matrix remains permanent through the life of the item and not damaged or destroyed in use.

Potential benefits of using 2D Data Matrix technology versus a standard barcode are as follows:
- can contain 100 times the data as the same space in a barcode;
- can be read omni-directionally;
- can be damaged but still return accurate data; and/or
- can be scaled up or down to fit within available marking space.

An imager can be used to retrieve the UID data elements from the item, which can then be assembled into a concatenated UID and transmitted to a database. Data Matrices cannot be read using an ordinary linear barcode laser scanner. Each Data Matrix can contain data represented in a uniquely identified code assigned to an individual item. The code can either contain the necessary data elements to construct the concatenated UID or an approved IUID Equivalent.

Via the UID Checker of certain exemplary embodiments, the camera can disable live video modes, regular image capture, and/or displays used to view UIDs, either at the camera and/or at a computer coupled to the camera, such as a personal computer ("PC") or programmable logic controller ("PLC"). Certain exemplary embodiments can prevent display of failed images on a report provided by the camera, disable inspections requiring read and rotate, and/or turn off live video completely on a computer. Via certain exemplary embodiments, if successful decode does not occur in a predetermined time period (e.g., approximately 1 to approximately 300 seconds, including all values and subranges therebetween) at the camera, images can be prevented from being provided to the computer. In order to prevent changes to settings that control this process, a fuse can be burned on the master ID word after loading a firmware version that locks this down and prevents: reflashing the camera; image upload; live video; and/or QView, and/or stops upload of any image that fails the decode. In certain exemplary embodiments, this process can utilize a new regressor suite without failures in it to test with as well as a handful of boards to test with that can only be shipped in secure cameras.

In certain exemplary embodiments, the digital camera can be reflashable in-house. For example, the burnt fuse, MAC Address, and/or a license key with a particular pattern can allow temporary flash of a new image into a normally locked camera. It can be appreciated that a restore of the UID/Verification key can occur after reflashing in-house to re-lock the camera.

As will be described in the following paragraphs, certain exemplary embodiments can provide processes for:
- assisting with locating UID data matrices without an image;
- displaying only the UID data matrix;
- preventing other applications from accessing raw images; and/or
- locking the secure firmware in the smart camera.

Visual Aid for Locating UID Data Matrices Without an Image

Figure 1:
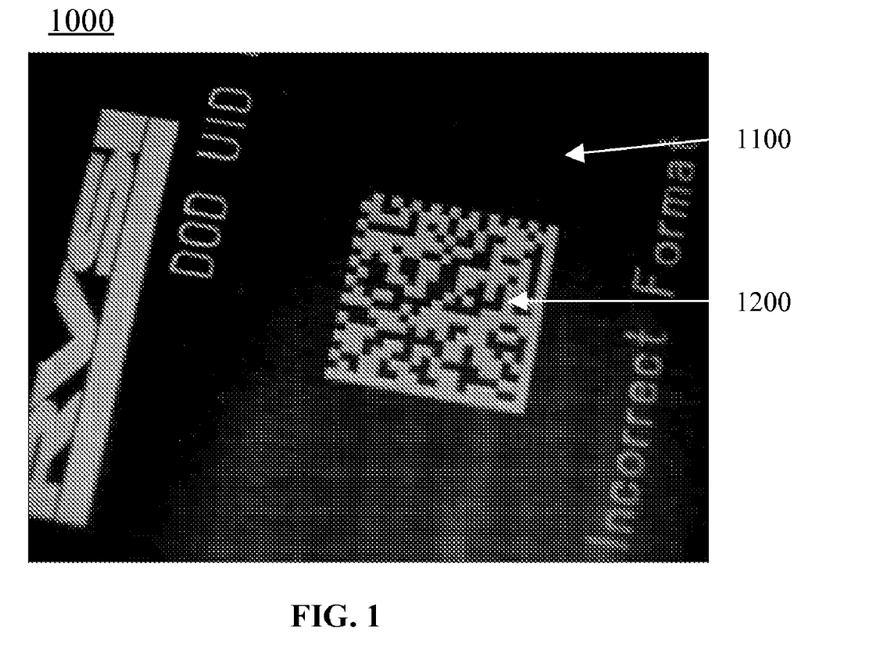
FIG. 1 is a photograph of an exemplary image 1000.

Via an exemplary un-secured process, unprocessed raw images can be sent from the digital camera as fast as possible in a mode called Live Video. FIG. 1 is a photograph of an exemplary raw image 1000, which can comprise a non-code zone 1100 and a two-dimensional code zone 1200.

Figure 2:
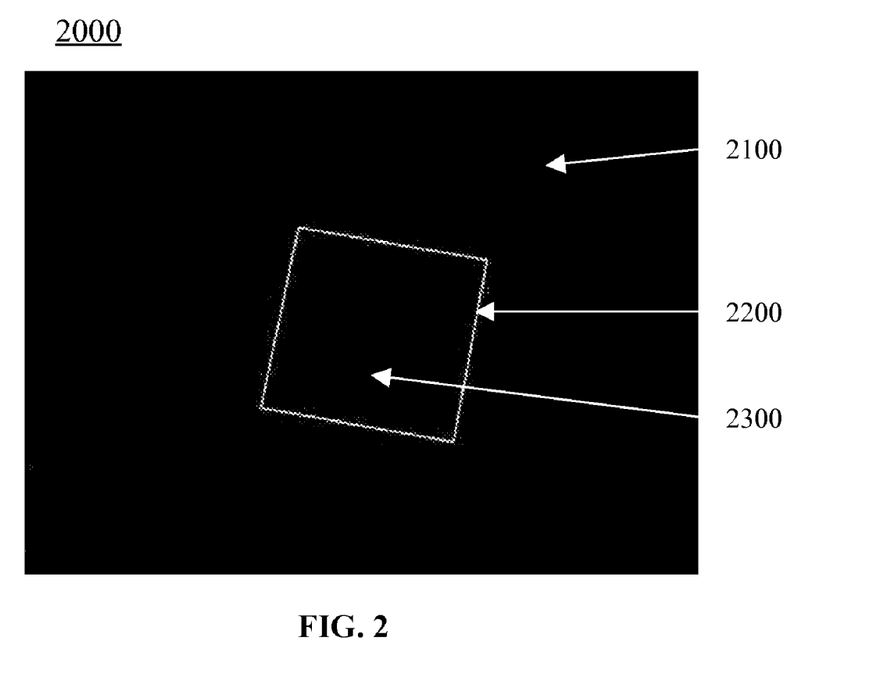
FIG. 2 is a photograph of an exemplary image 2000.

Via an exemplary secured process, the behavior of the Live Video mode can be changed as follows:
- Auto-Photometry can be turned on to provide the best hope of locating the Data Matrix in the absence of an operator seeing the image and manually correcting the exposure;
- raw images can be sent during the process of locating the Data Matrix within the image;
- bounding box coordinates can be calculated by the camera for the Data Matrix; and/or
- a blank image containing only the bounding box can be sent to the computer for display to assist the operator in aligning the Data Matrix. FIG. 2 is a photograph of an exemplary blank image 2000, which can comprise a blanked non-code zone 2100, a bounding box 2200, and/or a blanked two-dimensional code zone 2300.

Note that this sequence can be repeated as quickly as possible and/or desired.

Displaying Only the UID Data Matrix

Via an exemplary un-secured process:
- all images can be captured and/or read by the digital camera;
- an attempt can be made by the camera to locate the Data Matrix within the image;
- if located, an attempt can be made by the camera to decode the contents of the Data Matrix; and/or
- if decoded, an attempt can be made to perform Verification analysis on the Data Matrix image.

Figure 3:
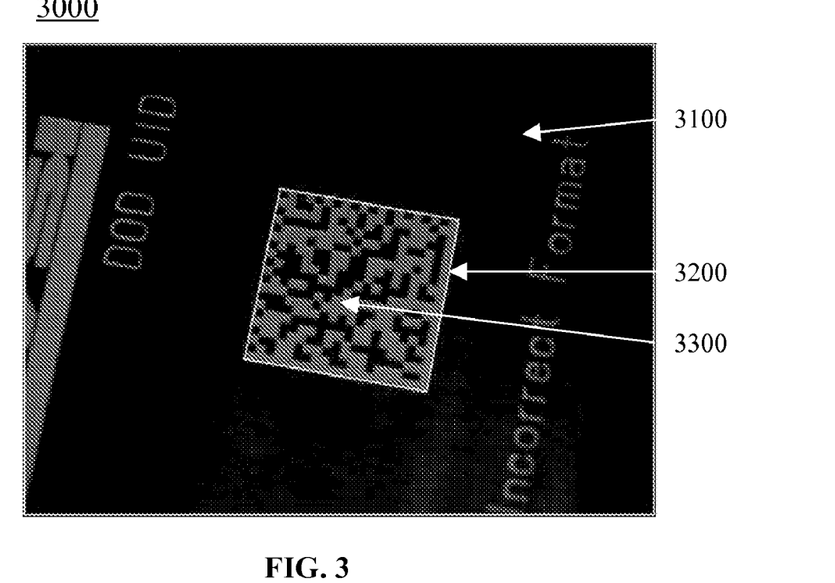
FIG. 3 is a photograph of an exemplary image 3000.

Note that regardless of the results from any step in this process, the raw image and the results of the process are always sent from the camera to the computer. FIG. 3 is a photograph of an exemplary raw image 3000, which can comprise a non-code zone 3100, a bounding box 3200, and/or a Data Matrix and/or two-dimensional code zone 3300.

Figure 4:
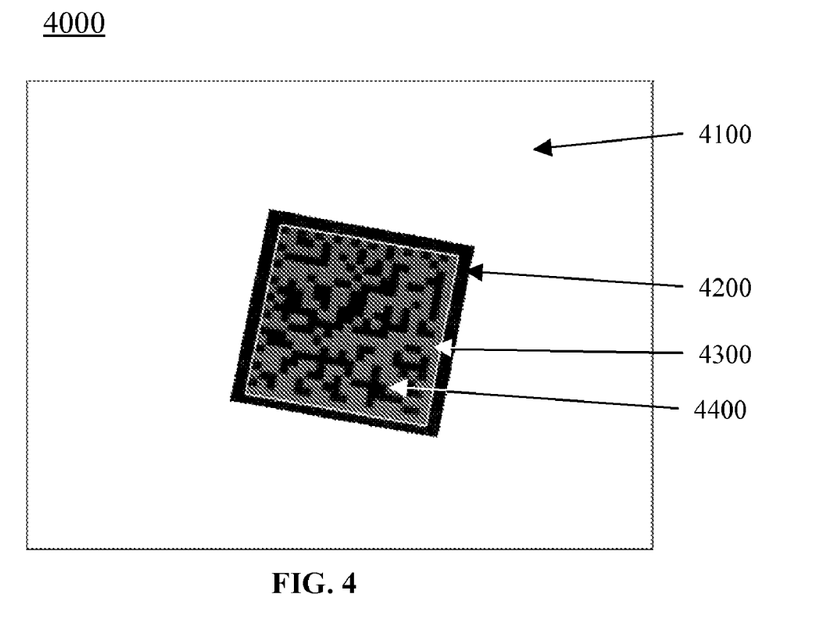
FIG. 4 is a photograph of an exemplary image 4000.
Figure 5:
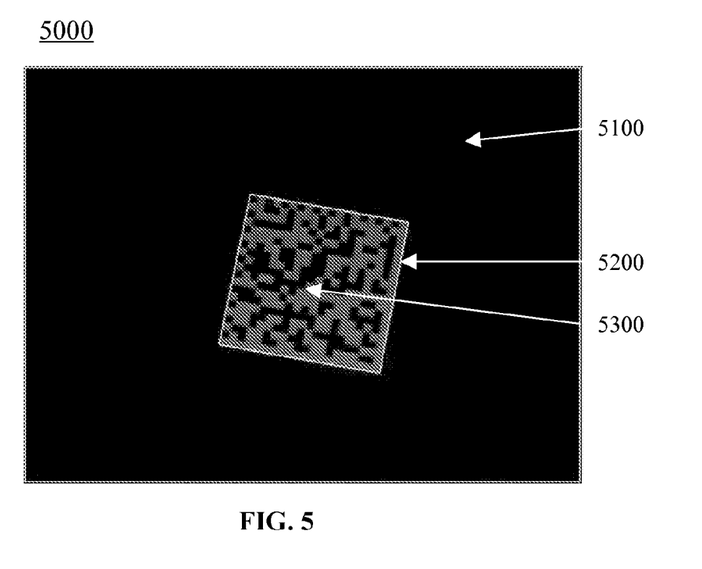
FIG. 5 is a photograph of an exemplary image 5000.

Via an exemplary secured process, all steps can be the same as the un-secured process, except for the last step, as follows:
- the raw image can be captured and/or read;
- if the locate fails—a blank image can be sent from the camera to the computer;
- if the locate passes and the decode is unsuccessful—a blank image with the located bounding box can be sent from the camera to the computer;
- if the decode is successful (proof positive that we are looking at a Data Matrix), as shown in FIG. 4, the bounding box for the matrix plus a clear zone around it can be calculated;
- the average clear zone grey scale value can be calculated;
- as shown in FIG. 5, everything outside the clear zone can be substituted with the clear zone grey scale value; and/or
- the results can be sent from the camera to the computer, along with the masked image with the clear zone for future analysis or comparison of grades after mark degradation;
- alternatively, if absolutely no image content at all is desired, an option can be offered to not provide the actual Data Matrix portion of the image at all. Instead, a black and white representation of the Data Matrix from the decoded string can be generated and the representation and/or a generated image corresponding thereto can be pasted in a blank image at the location of the detected data matrix. This can ensure that no identifiable image content whatsoever is included in the image that is archived—in the remote case that any secret information is included on the part location where the Data Matrix code is printed—e.g. color, surface finish, geometry, etc.

FIG. 4 is a photograph of an exemplary image 4000, which can comprise a blanked non-code zone 4100, a clear zone 4200, a bounding box 4300, and/or a Data Matrix and/or two-dimensional code zone 4400. FIG. 5 is a photograph of an exemplary image 5000, which can comprise a blanked non-code zone 5100, a bounding box 5200, and/or a Data Matrix and/or two-dimensional code zone 5300.

Preventing Other Applications from Accessing Raw Images

Via an exemplary un-secured process, unprocessed raw images can be uploaded from the camera by the code reading and/or processing software, such as the Siemens ReadRunner and/or QView software applications, by customer written applications based on the same underlying controls, and/or by simple socket communications and/or common network communication protocols (e.g., TCP/IP, FTP, etc.).

Via an exemplary secured process, all images can be processed in the camera prior to making them available for output. Images available to any application outside the camera can be limited to only blank images, blank images with a bounding box, and/or masked images.

Locking the Secure Firmware in the Smart Camera

Via an exemplary un-secured process, anyone with access to the camera's network and the camera configuration software can download an older version of the camera's firmware that will not recognize changes made to lock out the presentation of live raw images.

Via an exemplary secured process:
- The camera can be locked down in a way that still allows upgrades to be made.
- The license keys installed on the camera can turn on functionality in the firmware and prevent it from running if the option was not purchased.
- The license keys can be expanded to mark a camera as being secure. Two security keys can be used in this case, a "Secure" and "SecureKey Unlock" key. License keys can be camera-specific and/or can be not portable to other cameras.
- If either of these two security keys is set on the camera, the only key that may be entered can be limited to the other security key. All other keys can be rejected. This can prevent a non-secure key from being used.
- Flashing firmware to a Smart Camera can be rejected unless the "SecureKey Unlock" key is entered first.
- After flashing firmware to a Smart Camera is completed, the "Secure" key can be re-entered and the Smart Camera once again can be locked.

Figure 6:
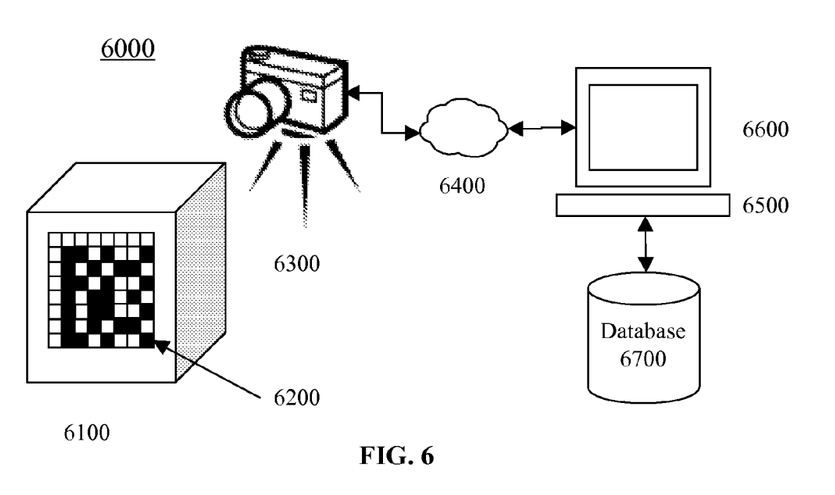
FIG. 6 is a block diagram of an exemplary embodiment of a system 6000.

FIG. 6 is a block diagram of an exemplary embodiment of a system 6000, which can comprise a photographed object 6100, which can include a one-dimensional code, two-dimensional code, Data Matrix code, and/or UID 6200, an image of which can be captured by camera 6300, which can be coupled via a network 6400 to a computer 6500. Coupled to computer 6500 can be a display 6600 for rendering images, codes, and/or representations thereof, and/or a database 6700 for storing images, codes, and/or representations thereof.

Figure 7:
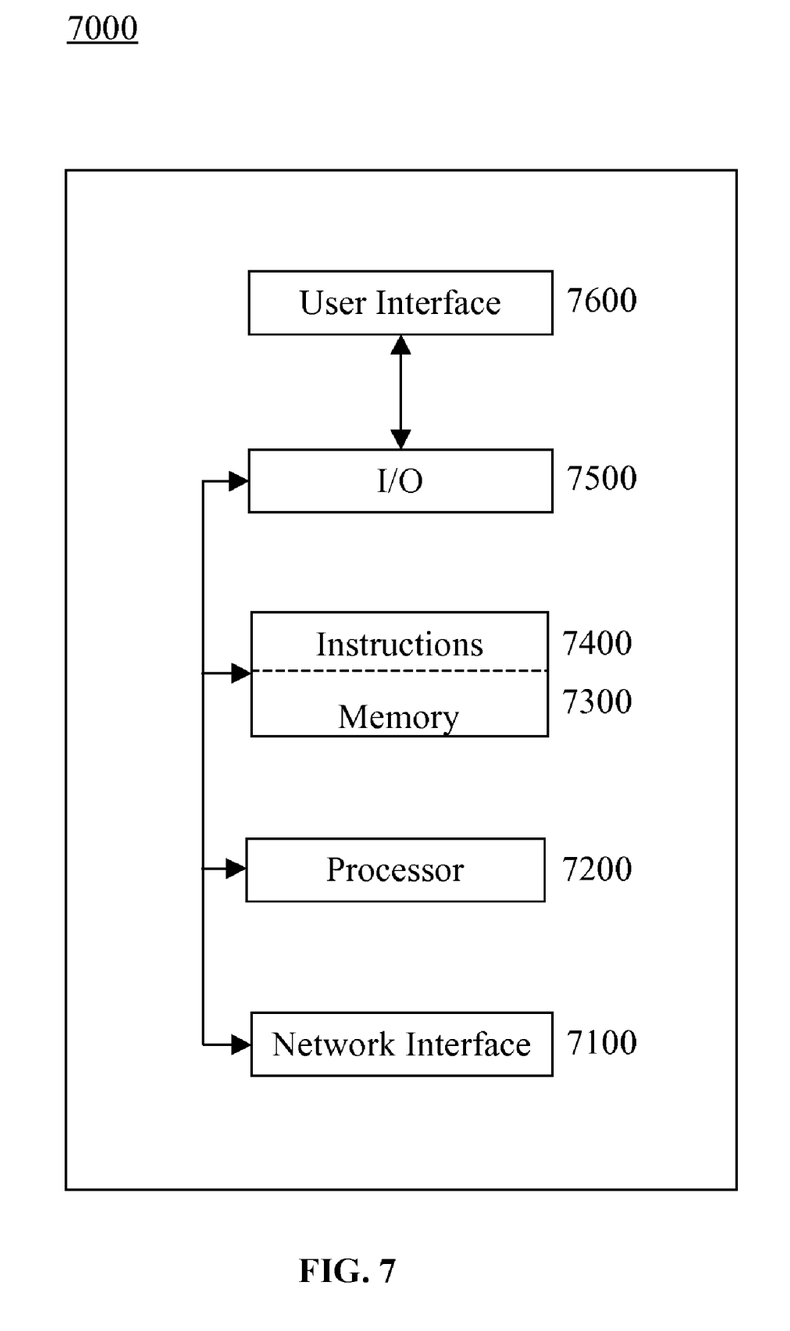
FIG. 7 is a block diagram of an exemplary embodiment of an information device 7000.

FIG. 7 is a block diagram of an exemplary embodiment of an information device 7000, which in certain operative embodiments can comprise, for example, camera 6300, computer 6500, etc. of FIG. 6. Information device 7000 can comprise any of numerous circuits and/or components, such as for example, one or more network interfaces 7100, one or more processors 7200, one or more memories 7300 containing instructions 7400, one or more input/output (I/O) devices 7500, and/or one or more user interfaces 7600 coupled to I/O device 7500, etc.

In certain exemplary embodiments, via one or more user interfaces 7600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, and/or information described herein.

Figure 8:
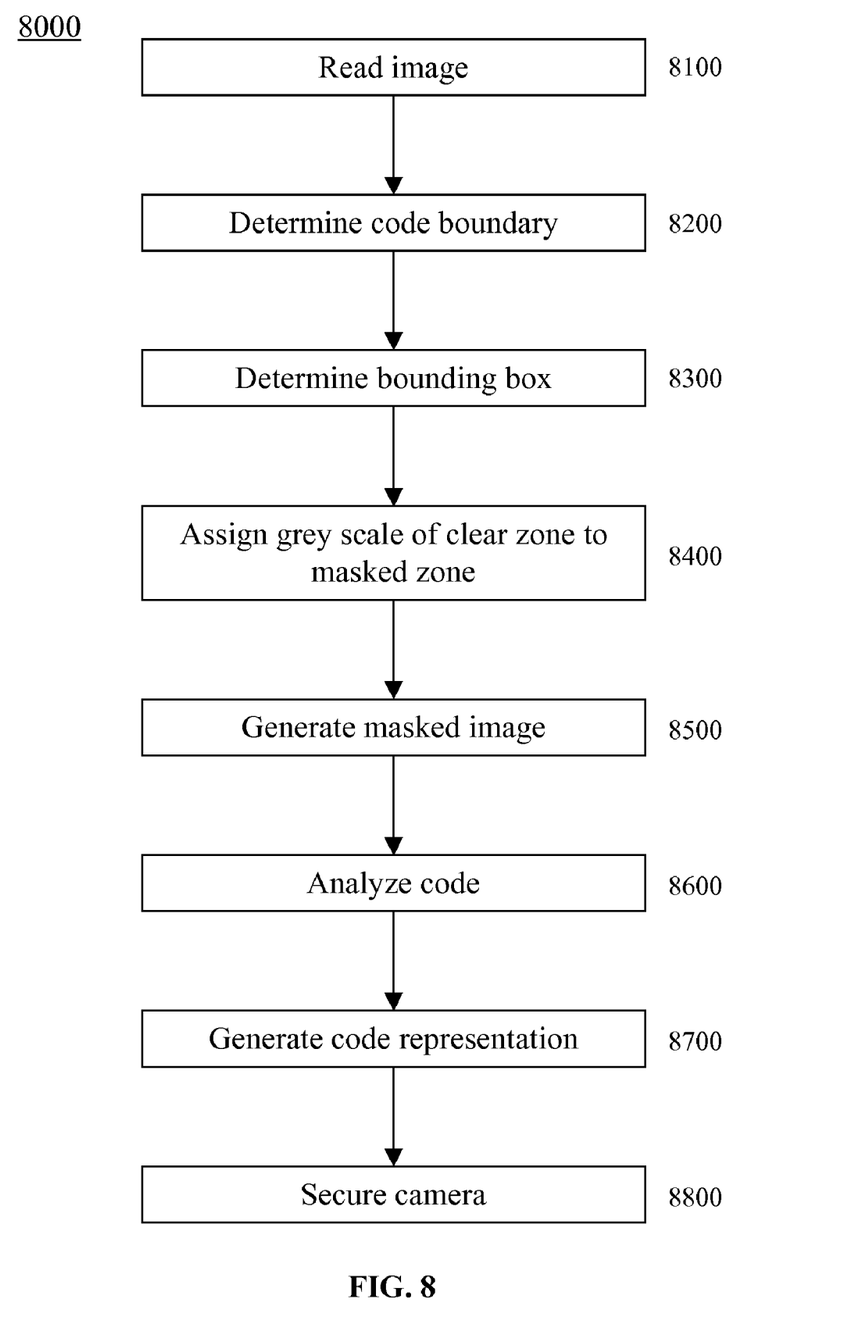
FIG. 8 is a flowchart of an exemplary embodiment of a method 8000.

FIG. 8 is a flowchart of an exemplary embodiment of a method 8000. At activity 8100, an image can be sensed, received, captured, and/or read by a camera, such as into a sensor unit and/or a memory of a digital still and/or video camera. At activity 8200, a location and/or outer boundary of a machine-readable one-dimensional code, two-dimensional code, Data Matrix code, and/or UID (hereinafter "code") in the captured image can be automatically determined by the camera, perhaps after assisting a human operator with aligning the code with a predetermined orientation for analysis by the camera. At activity 8300, a bounding box and/or coordinates thereof for the code can be automatically calculated and/or determined by the camera.

At activity 8400, an approximate average grey scale value for a clear zone surrounding the code can be automatically calculated and/or determined by the camera and/or assigned to a grey scale value of substantially all pixels located within the image but outside the clear zone (i.e., in the masked zone). At activity 8500, a masked image can be generated by the camera, sent to the computer, displayed, and/or stored, the masked image comprising the code or a representation thereof, and the masked zone. Responsive to a determination that the code can not be located in said captured image, the masked zone can include the entirety of the captured image.

At activity 8600, the code can be decoded, analyzed, and/or verified. At activity 8700, a representation, such as a machine-readable and/or human readable representation, of the code can be generated, sent to the computer, displayed, and/or stored.

At activity 8800, responsive to a predetermine event, such as for example, a determination that the code can not be located in the captured image, a determination that the code can not be decoded in a predetermined time period, and/or entry of a predetermined key into a user interface of the camera, the camera can be secured via disabling any of various functions of the camera, such as capturing images, displaying images, storing images, accessing images by other applications, revising operation, settings, and/or firmware, locking and/or disabling operation, settings, and/or firmware, etc.

Definitions

When the following terms are used substantively herein, the accompanying definitions apply. These terms and definitions are presented without prejudice, and, consistent with the application, the right to redefine these terms during the prosecution of this application or any application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

access—(v) to enter, approach, communicate with and/or through, make use of, and/or pass to and/or from; (n) a permission, liberty, right, mechanism, or ability to enter, approach, communicate with and/or through, make use of, and/or pass to and/or from a place, thing, and/or person.

activity—an action, act, step, and/or process or portion thereof.

adapted—suitable, fit, and/or capable of performing a specified function.

align—to arrange with respect to a line and/or plurality of points.

all—each and every.

and/or—either in conjunction with or in alternative to.

apparatus—an appliance or device for a particular purpose.

approximately—about and/or nearly the same as.

assign—to designate, appoint, allot, and/or attribute, and/or to select and set apart for a particular purpose.

assist—to give help or support to.

associate—to join, connect together, and/or relate.

automatically—acting and/or operating in a manner essentially independent of external human influence and/or control. For example, an automatic light switch can turn on upon "seeing" a person in its view, without the person manually operating the light switch.

average—a value obtained by dividing the sum of a set of quantities by the number of quantities in a set and/or an approximation of a statistical expected value.

backbone network—a "transit" network often made up of long-distance telephone trunk lines and/or other wired and/or wireless links such as microwave and satellite links for use in transmitting large amounts of data simultaneously between host computer systems connected to the Internet. Normal communicated data typically neither originates nor terminates in a backbone network.

barcode—information expressible as a series of symbols, such as clusters of dots, parallel bars of varying widths, etc., that can be read by an optical scanner and interpreted as numerical and/or alphabetical characters.

barcode reader—a device and/or system adapted to scan and/or decode a barcode.

border—to be located and/or positioned adjacent to an outer edge, surface, and/or extent of an object.

boundary—a limit and/or furthest extent of.

bounding box—a rectangular shape that defines an outer boundary.

calculating—determining via mathematics and/or logical rules.

camera—a device often comprising a lightproof enclosure having an aperture with a lens through which a still and/or moving image of an object is focused and recorded on a photosensitive film, plate, tape, and/or or sensor coupled to an electronic and/or optical memory device (e.g., RAM, EEPROM, flash memory, magnetic disk, optical disk, etc.).

can—is capable of, in at least some embodiments.

capture—to sense, receive, obtain, enter, and/or record in memory.

cause—to produce an effect.

circuit—an electrically conductive pathway and/or a communications connection established across two or more switching devices comprised by a network and between corresponding end systems connected to, but not comprised by the network.

clear zone—a region devoid of a machine-readable two-dimensional code.

code—at least one character representing and/or corresponding to data having a predefined value or values.

comprising—including but not limited to, what follows.

configure—to make suitable or fit for a specific use or situation.

content—substance and/or substantive portion of a stored and/or written work.

convert—to transform, adapt, and/or change.

coordinate—any of a set of two or more numbers used to determine the position of a point, line, polygon, curve, or plane in a space of a given dimension with respect to a system of lines or other fixed references.

create—to bring into being.

data—distinct pieces of information, usually formatted in a special or predetermined way and/or organized to express concepts.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

decode—to convert data by reversing the effect of previous encoding, and/or to interpret a code and/or signal.

define—to establish the meaning, relationship, outline, form, and/or structure of, and/or to precisely and/or distinctly describe and/or specify.

determination—an act of making or arriving at a decision.

determine—to obtain, calculate, decide, deduce, and/or ascertain.

device—a machine, manufacture, and/or collection thereof.

devoid—not possessing, void of, and/or lacking.

digital—non-analog; discrete.

digital camera—a camera that captures an image not on film, but initially in an electronic imaging sensor coupled to a memory.

disable—to make unable, unfit, and/or incapable.

display—(v.) to visually render. (n.) an electronic device that represents information in visual form and/or a visual representation of something.

each—every one of a group considered individually.

enter—to input, come, and/or flow into.

entry—a result of entering.

equal—substantially the same as.

first—an initial entity in an ordering.

further—in addition.

generate—to create, make produce, give rise to, and/or bring into existence.

grey-scale—a progressive classification that ranges from white to black or vice versa.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

identify—to specify, recognize, detect, and/or establish the identity, origin, nature, and/or definitive characteristics of image—an at least two-dimensional representation of an entity and/or phenomenon.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as a Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

input/output (I/O) device—any sensory-oriented input and/or output device, such as an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, haptic device, vibrator, tactile simulator, and/or tactile pad, potentially including a port to which an I/O device can be attached or connected.

into—to a condition, state, or form of.

key—a predetermined physical or informational thing that affords a means of access, such as a device used to open a physical lock, a plurality of symbols, an image, biometric data, etc.

limiting—constraining.

located—situated in a particular spot, region, and/or position.

location—a place.

machine instructions—directions adapted to cause a machine, such as an information device, to perform one or more particular activities, operations, or functions. The directions, which can sometimes form an entity called a "processor", "kernel", "operating system", "program", "application", "utility", "subroutine", "script", "macro", "file", "project", "module", "library", "class", and/or "object", etc., can be embodied as machine code, source code, object code, compiled code, assembled code, interpretable code, and/or executable code, etc., in hardware, firmware, and/or software.

machine readable medium—a physical structure from which a machine can obtain data and/or information. Examples include a memory, punch cards, etc.

machine-readable—of a form from which an information device can obtain data and/or information.

may—is allowed and/or permitted to, in at least some embodiments.

memory—a device capable of storing analog or digital information, for example, a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory can be coupled to a processor and can store instructions adapted to be executed by processor according to an embodiment disclosed herein.

memory device—an apparatus capable of storing analog or digital information, such as instructions and/or data. Examples include a non-volatile memory, volatile memory, Random Access Memory, RAM, Read Only Memory, ROM, flash memory, magnetic media, a hard disk, a floppy disk, a magnetic tape, an optical media, an optical disk, a compact disk, a CD, a digital versatile disk, a DVD, and/or a raid array, etc. The memory device can be coupled to a processor and/or can store instructions adapted to be executed by processor, such as according to an embodiment disclosed herein.

method—a process, procedure, and/or collection of related activities for accomplishing something.

network—a communicatively coupled plurality of nodes. A network can be and/or utilize any of a wide variety of sub-networks, such as a circuit switched, public-switched, packet switched, data, telephone, telecommunications, video distribution, cable, terrestrial, broadcast, satellite, broadband, corporate, global, national, regional, wide area, backbone, packet-switched TCP/IP, USB, PS2, FireWire, Bluetooth, WiFi, Ethernet, PROFIBUS, PROFINET, RS232, Token Ring, public Internet, private, ATM, multi-domain, and/or multi-zone sub-network, one or more Internet service providers, and/or one or more information devices, such as a switch, router, and/or gateway not directly connected to a local area network, etc.

network interface—any device, system, or subsystem capable of coupling an information device to a network. For example, a network interface can be a telephone, cellular phone, cellular modem, telephone data modem, fax modem, wireless transceiver, ethernet card, cable modem, digital subscriber line interface, bridge, hub, router, or other similar device.

non-code zone—a region that surrounds a machine-readable two-dimensional code yet itself is devoid of any machine-readable two-dimensional code.

not—a negation of something.

one-dimensional ("1-D") code—a bar code and/or other type of machine-readable code, often used for marking physical items, comprising black and/or white visual elements, bars, dots, and/or cells arranged in a predetermined pattern. As exemplified by the ordinary bar code, a 1-D code is typically presented in a "vertically redundant" fashion, meaning that the same information is repeated vertically, such that the heights of the bars can be truncated without any loss of information. The vertical redundancy allows, however, a symbol with printing defects, such as spots or voids, to still be read. The higher the bar heights, the more probability that at least one path along the bar code will be readable. Additional examples include: Code 128, Code 39, Codabar, Code 93, I2of5, UPC/EAN/JAN, UPC-E, UPC Supplements, RSS and Composite, Codablock F, Code 11, Matrix 2 of 5, MSI Plessy, NEC 2 of 5, Postnet, Pharmacode, Telepen, and BC412.

operation—a series of actions in performing a function.

operator—one observing and/or controlling a machine or device.

orientation—a positioning of a first object relative to a second object.

outside—the space beyond a boundary and/or limit.

packet—a discrete instance of communication.

pixel—a discrete element of a digital image.

plurality—the state of being plural and/or more than one.

predetermine—to determine, decide, or establish in advance.

prevent—to impede, hinder, stop, and/or keep from happening.

probability—a quantitative representation of a likelihood of an occurrence.

processor—a device and/or set of machine-readable instructions for performing one or more predetermined tasks. A processor can comprise any one or a combination of hardware, firmware, and/or software. A processor can utilize mechanical, pneumatic, hydraulic, electrical, magnetic, optical, informational, chemical, and/or biological principles, signals, and/or inputs to perform the task(s). In certain embodiments, a processor can act upon information by manipulating, analyzing, modifying, converting, transmitting the information for use by an executable procedure and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium IV series of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein.

project—to calculate, estimate, or predict.

provide—to furnish, supply, give, and/or make available.

receive—to get as a signal, take, acquire, and/or obtain.

render—to make perceptible to a human, for example as data, commands, text, graphics, audio, video, animation, and/or hyperlinks, etc., such as via any visual, audio, and/or haptic means, such as via a display, monitor, electric paper, ocular implant, cochlear implant, speaker, etc.

repeatedly—again and again; repetitively.

representation—an approximation, equivalent, mathematical characterization, rendering, image, and/or likeness of something.

request—to express a desire for and/or ask for.

responsive—reacting to an influence and/or impetus.

said—when used in a system or device claim, an article indicating a subsequent claim term that has been previously introduced.

save—retain data in a memory device.

second—an entity immediately following a first entity in an ordering.

select—to make a choice or selection from alternatives.

set—a related plurality.

signal—information, such as machine instructions for activities and/or one or more letters, words, characters, symbols, signal flags, visual displays, and/or special sounds, etc. having prearranged meaning, encoded as automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc. Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

store—to place, hold, retain, enter, and/or copy into and/or onto a machine-readable medium.

substantially—to a great extent or degree.

surround—to encircle, enclose, and/or confine on several and/or all sides.

system—a collection of mechanisms, devices, machines, articles of manufacture, processes, data, and/or instructions, the collection designed to perform one or more specific functions.

time period—an interval of time.

transmit—to send as a signal, provide, furnish, and/or supply.

two-dimensional ("2-D") code—a machine-readable code, often used for marking relatively small physical items, comprising black and/or white visual elements and/or cells that are typically substantially square and arranged in a square and/or rectangular pattern, that encode data along the height as well as the length of the overall code or symbol. Typically, a white cell is assigned a value of 0, and a black cell is assigned a value of 1, or vice versa. The terms "stacked symbology" and "multi-row code" are typically applied to those symbologies made up of a series of one-dimensional bar codes whose data is encoded in a series of bars and spaces of varying widths. The term "Matrix Code" applies to 2-D codes that encode data based on the position of black (or white) cells within a matrix, wherein each black (or white) cell has substantially the same dimensions and the position of the cell encodes the data. Examples include: Code 1, Code 49, Code 16K, 3D Barcode, 3-DI, ArrayTag, Aztec Code, Small Aztec Code, Codablock, CP Code, DataGlyphs, Data Matrix, Datastrip Code, Dot Code A, GoCode, HCCB, hueCode, INTACTA.CODE, MaxiCode, MiniCode, PDF417, Micro PDF417, MicroQR Code, QR Code, SmartCode, Snowflake Code, SuperCode, UltraCode, ISO 15415, AIM DPM (Draft Rev D), AS9132/IAQG, and DPM Verification of Siemens.

until—till and/or up to the time that or when.

user interface—a device and/or software program for rendering information to a user and/or requesting information from the user. A user interface can include at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

value—a measured, assigned, determined, and/or calculated quantity or quality for a variable and/or parameter.

verify—to establish the accuracy of provided information, such as determining whether a location is correct.

via—by way of and/or utilizing.

weight—a value indicative of importance.

within—inside.

Note

Still other substantially and specifically practical and useful embodiments will become readily apparent to those skilled in this art from reading the above-recited and/or herein-included detailed description and/or drawings of certain exemplary embodiments. It should be understood that numerous variations, modifications, and additional embodiments are possible, and accordingly, all such variations, modifications, and embodiments are to be regarded as being within the scope of this application.

Thus, regardless of the content of any portion (e.g., title, field, background, summary, description, abstract, drawing figure, etc.) of this application, unless clearly specified to the contrary, such as via explicit definition, assertion, or argument, with respect to any claim, whether of this application and/or any claim of any application claiming priority hereto, and whether originally presented or otherwise:

there is no requirement for the inclusion of any particular described or illustrated characteristic, function, activity, or element, any particular sequence of activities, or any particular interrelationship of elements;

any elements can be integrated, segregated, and/or duplicated;

any activity can be repeated, any activity can be performed by multiple entities, and/or any activity can be performed in multiple jurisdictions; and any activity or element can be specifically excluded, the sequence of activities can vary, and/or the interrelationship of elements can vary.

Moreover, when any number or range is described herein, unless clearly stated otherwise, that number or range is approximate. When any range is described herein, unless clearly stated otherwise, that range includes all values therein and all subranges therein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any claim element is followed by a drawing element number, that drawing element number is exemplary and non-limiting on claim scope.

Any information in any material (e.g., a United States patent, United States patent application, book, article, etc.) that has been incorporated by reference herein, is only incorporated by reference to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Accordingly, every portion (e.g., title, field, background, summary, description, abstract, drawing figure, etc.) of this application, other than the claims themselves, is to be regarded as illustrative in nature, and not as restrictive.

What is claimed is:

1. A method comprising:
   via a digital camera, responsive to a determination that a machine-readable two-dimensional code has been identified in a first image captured by said camera, said first image being a grey-scale image comprising a first plurality of pixels defining said machine-readable two-dimensional code and second plurality of pixels defining a non-code zone, automatically causing a storing or displaying of a second image that comprises said machine-readable two-dimensional code or a representation of said machine-readable two-dimensional code and that is devoid of said second plurality of pixels; and
   calculating an average grey scale value for a clear zone surrounding said machine-readable two-dimensional code.

2. A method comprising:
   via a digital camera, responsive to a determination that a machine-readable two-dimensional code has been identified in a first image captured by said camera, said first image being a grey-scale image comprising a first plurality of pixels defining said machine-readable two-dimensional code and second plurality of pixels defining a non-code zone, automatically causing a storing or displaying of a second image that comprises said machine-readable two-dimensional code or a representation of said machine-readable two-dimensional code and that is devoid of said second plurality of pixels; and
   assigning an average grey scale value for a clear zone surrounding said machine-readable two-dimensional code to all pixels located outside said clear zone and within an outside boundary of said first image.

3. A method comprising:
   via a digital camera, responsive to a determination that a machine-readable two-dimensional code has been identified in a first image captured by said camera, said first image being a grey-scale image comprising a first plurality of pixels defining said machine-readable two-dimensional code and second plurality of pixels defining a non-code zone, automatically causing a storing or displaying of a second image that comprises said machine-readable two-dimensional code or a representation of said machine-readable two-dimensional code and that is devoid of said second plurality of pixels; and
   generating a masked image comprising said machine-readable two-dimensional code and a masked zone comprising only pixels located outside a clear zone surrounding said machine-readable two-dimensional code and within an outside boundary of the image, each pixel in said masked zone having a grey scale value approximately equal to an average grey scale value for said clear zone.

4. A method comprising:
   via a digital camera, responsive to a determination that a machine-readable two-dimensional code has been identified in a first image captured by said camera, said first image being a grey-scale image comprising a first plurality of pixels defining said machine-readable two-dimensional code and second plurality of pixels defining a non-code zone, automatically causing a storing or displaying of a second image that comprises said machine-readable two-dimensional code or a representation of said machine-readable two-dimensional code and that is devoid of said second plurality of pixels; and
   displaying a masked image comprising said machine-readable two-dimensional code and a masked zone comprising only pixels located outside a clear zone surrounding said machine-readable two-dimensional code and within an outside boundary of the image, each pixel in said masked zone having a grey scale value approximately equal to an average grey scale value for said clear zone.

5. A method comprising:
   via a digital camera, responsive to a determination that a machine-readable two-dimensional code has been identified in a first image captured by said camera, said first image being a grey-scale image comprising a first plurality of pixels defining said machine-readable two-dimensional code and second plurality of pixels defining a non-code zone, automatically causing a storing or displaying of a second image that comprises said machine-readable two-dimensional code or a representation of said machine-readable two-dimensional code and that is devoid of said second plurality of pixels; and
   storing a masked image comprising said machine-readable two-dimensional code and a masked zone comprising only pixels located outside a clear zone surrounding said machine-readable two-dimensional code and within an outside boundary of the image, each pixel in said masked zone having a grey scale value approximately equal to an average grey scale value for said clear zone.

6. A method comprising:

via a digital camera, responsive to a determination that a machine-readable two-dimensional code has been identified in a first image captured by said camera, said first image being a grey-scale image comprising a first plurality of pixels defining said machine-readable two-dimensional code and second plurality of pixels defining a non-code zone, automatically causing a storing or displaying of a second image that comprises said machine-readable two-dimensional code or a representation of said machine-readable two-dimensional code and that is devoid of said second plurality of pixels; and responsive to a determination that said machine-readable two-dimensional code cannot be located in said first image, displaying a third image comprising a border of said first image and no content.

* * * * *